(12) United States Patent
Cho et al.

(10) Patent No.: US 11,214,976 B2
(45) Date of Patent: Jan. 4, 2022

(54) INTELLIGENT VEHICLE TRANSPORT ROBOT FOR SINGLE-LEVEL PARKING LOT HAVING NO DRIVE AISLES

(71) Applicant: Min Seo Cho, Bucheon-si (KR)

(72) Inventors: Min Seo Cho, Bucheon-si (KR); Hyeon Hui Kim, Bucheon-si (KR)

(73) Assignee: Min Seo Cho, Gyeonggi-do (KR)

( * ) Notice: Subject to any disclaimer, the term of this patent is extended or adjusted under 35 U.S.C. 154(b) by 0 days.

(21) Appl. No.: 16/757,427

(22) PCT Filed: Sep. 19, 2018

(86) PCT No.: PCT/KR2018/011011
§ 371 (c)(1),
(2) Date: Apr. 20, 2020

(87) PCT Pub. No.: WO2019/083166
PCT Pub. Date: May 2, 2019

(65) Prior Publication Data
US 2020/0340263 A1  Oct. 29, 2020

(30) Foreign Application Priority Data
Oct. 24, 2017 (KR) .................. 10-2017-0138539

(51) Int. Cl.
*E04H 6/36* (2006.01)
*B60P 3/073* (2006.01)
(Continued)

(52) U.S. Cl.
CPC ............. *E04H 6/36* (2013.01); *B60P 3/073* (2013.01); *E04H 6/305* (2013.01); *G08G 1/144* (2013.01); *G08G 1/145* (2013.01)

(58) Field of Classification Search
CPC .. E04H 6/36; E04H 6/305; E04H 6/18; E04H 6/34; E04H 6/28; E04H 6/424
See application file for complete search history.

(56) References Cited

U.S. PATENT DOCUMENTS 2,904,200 A * 9/1959 Diehl ................ E04H 6/305
                                                    414/459
3,235,106 A * 2/1966 Diehl ................ E04H 6/305
                                                    414/429
(Continued)

FOREIGN PATENT DOCUMENTS

JP    08-170438 A    7/1996
KR    10-0281674 B1  2/2001
(Continued)

OTHER PUBLICATIONS

International Search Report for PCT/KR2018/011011 dated Dec. 20, 2018 from Korean Intellectual Property Office.

*Primary Examiner* — Mark C Hageman
(74) *Attorney, Agent, or Firm* — Revolution IP, PLLC

(57) ABSTRACT

The present invention can provide an intelligent vehicle transport robot for a single-level parking lot, wherein: parking lines for indicating parking locations of respective vehicles are marked on a parking lot formed at a single level; the parking lines are marked in a checkerboard pattern so as to exclude drive aisles for vehicle movements and thus increase the number of vehicles that can be accommodated in parking spaces; and a vehicle transport robot (10) is provided in the parking lot, which performs vehicle parking and retrieval by moving a vehicle above parked vehicles, whereby due to exclusion of drive aisles, the number of vehicles that can be accommodated in parking spaces is increased as compared to a conventional parking lot having the same area, and thus the parking efficiency of the parking lot can be improved.

4 Claims, 9 Drawing Sheets

(51) Int. Cl.
*E04H 6/30* (2006.01)
*G08G 1/14* (2006.01)

(56) References Cited

U.S. PATENT DOCUMENTS

| | | | | |
|---|---|---|---|---|
| 3,987,912 | A * | 10/1976 | Leon Moyano | E04H 6/18 414/239 |
| 5,415,517 | A * | 5/1995 | Lanigan, Sr. | B65G 63/004 414/809 |
| 10,766,698 | B2 * | 9/2020 | Lindbo | B65G 1/0464 |
| 2017/0226764 | A1 * | 8/2017 | Nussbaum | E04H 6/36 |

FOREIGN PATENT DOCUMENTS

| | | |
|---|---|---|
| KR | 10-2003-0039852 A | 5/2003 |
| KR | 10-2005-0100094 A | 10/2005 |
| KR | 10-2007-0024793 A | 3/2007 |

* cited by examiner

//INTELLIGENT VEHICLE TRANSPORT ROBOT FOR SINGLE-LEVEL PARKING LOT HAVING NO DRIVE AISLES

TECHNICAL FIELD

The present invention relates to a vehicle transport robot of a flat parking lot, and more specifically, to an intelligent vehicle transport robot of a flat parking lot, which enhances parking efficiency by increasing the number of parking vehicles in the same area by removing driveways, through which the vehicles move, in the flat parking lot.

BACKGROUND ART

As the population and vehicles in cities gradually increase owing to economic development, the problem of parking vehicles in the cities becomes an issue to be solved urgently. A conventional single flat parking lot occupies a lot of valuable land resources and does not satisfy demands on the parking lot.

As shown in FIG. 1, individual parking units are formed in a conventional flat parking lot by partitioning spaces for parking vehicles on a flat floor and drawing predetermined parking lines using a predetermined paint.

In addition, a plurality of parking units is connected in a mutually adjacent manner to form parking modules, and driveways, through which the vehicles move, are formed between the front sides of the parking modules.

That is, a plurality of parking units, which are areas partitioned to individually park vehicles, is formed in a conventional flat parking lot, and parking modules including a plurality of adjacent parking units are formed, and driveways, through which the vehicles move, are formed between the parking modules.

At this point, since the driveways, through which the vehicles move, occupy a lot of valuable land resources, there is a problem of reducing parking efficiency in the same area.

DISCLOSURE OF INVENTION

Technical Problem

Therefore, the present invention has been made in view of the above problems, and it is an object of the present invention to provide an intelligent vehicle transport robot of a flat parking lot, which enhances parking efficiency by providing the vehicle transport robot in the flat parking lot, marking parking lines of a checkerboard shape, and increasing the number of parking vehicles in the same area by removing driveways, through which the vehicles move.

However, the object of the present invention is not limited to the object mentioned above, and unmentioned other objects will be clearly understood by those skilled in the art from the following description.

Technical Solution

In the present invention for accomplishing the above object, parking lines to indicate vehicle positions where individual vehicles are parked are marked in a parking lot formed on one plane, and as the parking lines are marked in a checkerboard shape, a flat parking lot increases the number of parking vehicles by removing driveways, through which the vehicles move, and a vehicle transport robot 10 performs parking and exit operation of the vehicles in the flat parking lot by moving the vehicles parked in the flat parking lot. The vehicle transport robot 10 is formed to move a vehicle to a space above a parked vehicle when parking or exit of the vehicle is progressed in a flat parking lot that enhances parking efficiency by increasing the number of parking vehicles in the same area by removing driveways, through which the vehicles move, and performs parking and exit of vehicles.

In addition, as a position marker capable of recognizing a moving position when the vehicle transport robot 10 moves is provided on the marked parking line, and a sensing sensor capable of sensing the position marker is attached to the vehicle transport robot 10, the vehicle transport robot 10 may move while tracking the position marker through the sensing sensor.

In addition, it is preferable that the position marker is a reflective material reflecting light or a metal material reacting to electricity, and the sensing sensor is an optical sensor for sensing the position marker through a light emitting unit and a light receiving unit or a magnetic field sensor for generating a magnetic field and sensing the metal material.

In addition, an identification code is assigned to each parking unit divided by the parking lines, and the vehicle transport robot 10 includes: a vehicle presence sensor for determining whether or not a vehicle exists in a parking unit; an input unit for receiving information on entry and exit of a vehicle; a control unit for analyzing the information inputted through the input unit, and handling entry and exit of the vehicle; and a storage unit for storing a plate number of a vehicle parked in each parking unit.

In addition, the vehicle transport robot 10 includes: a frame unit 100 for maintaining an external form; a driving unit 400 for moving the vehicle transport robot 10; a lifting unit 200 for loading and moving a vehicle to an upper position; and a clamping unit 300 for loading the vehicle, in which the loaded vehicle is lifted to the upper position through the lifting unit 200 after the vehicle is loaded by the clamping unit 300, and the vehicle transport robot 10 may be moved by the driving unit 400 as the information inputted into the input unit is analyzed through the control unit.

At this point, the frame unit 100 includes: four leg units 110 disposed to be perpendicular to the ground, and formed to configure a quadrangular frame while being spaced apart from each other by a predetermined distance; and a top supporter 120 formed to configure a rectangle by connecting top ends of the four leg units 110, in which four sides of a left side, a right side, a front side, and a rear side are formed by the four leg units 110, and the top supporter 120 is divided into two long side top supporters 121 and 122 included in the left side and the right side, and two short side top supporters 125 and 126 included in the front side and the rear side.

In addition, long side middle supporters 131 and 132 are provided in the middle of the left side and the right side under the two long side top supporters 121 and 122 constituting the left side and the right side to connect middle portions of the leg units 110.

Meanwhile, the lifting unit 200 includes: two left side guide units 211 parallel to the leg units 110 and fixed by connecting the long side top supporter 121 and the long side middle supporter 131 of the left side; two right side guide units 212 parallel to the leg units 110 and fixed to the long side top supporter 122 and the long side middle supporter 132 of the right side; two left side lifting units 221 guided by the two left side guide units 211; a left side lifting hook unit 231 disposed at a predetermined position of the left side lifting unit 221; a left side wire 241 connected to the left side lifting hook unit 231; a left side pulley 251 for winding the left side wire 241; and a left side motor 261 for transferring rotation force to the left side pulley 251.

In addition, the lifting unit 200 includes: two right side lifting units 222 guided by the two right side guide units 212; a right side lifting hook unit 232 disposed at a predetermined position of the right side lifting unit 222; a right side wire 242 connected to the right side lifting hook unit 232; a right side pulley 252 for winding the right side wire 242; and a right side motor 262 for transferring rotation force to the right side pulley 252, in which the left side lifting unit 221 and the right side lifting unit 222 ascend upward or descend downward as the left side pulley 251 and the right side pulley 252 rotate.

In addition, a left side clamp unit 311 capable of holding a wheel of the vehicle is provided under the left side lifting unit 221, and a right side clamp unit 312 capable of holding a wheel of the vehicle is provided under the right side lifting unit 222, and when the left and right side lifting units 221 and 222 ascend or descend, the left and right side clamp units 311 and 312 hold the wheels of the vehicle and perform ascending and descending.

The features and advantages of the present invention will become more apparent from the following detailed description based on the accompanying drawings.

Prior to this, the terms or words used in this specification and claims should not be interpreted in a conventional and lexical sense, and it should be interpreted as meanings and concepts consistent with the technical spirit of the present invention on the basis of the principle that the inventor can appropriately define the concept of the terms in order to describe his or her invention in the best way.

Advantageous Effects

According to the present invention as described above, as a vehicle transport robot is provided to perform parking and exit operation of the vehicles by moving a vehicle to a space above a parked vehicle, there is an effect of increasing the number of parking vehicles by enhancing parking efficiency of vehicles in the same area by removing driveways, through which the vehicles move.

BEST MODE FOR CARRYING OUT THE INVENTION

Hereafter, a preferred embodiment of the present invention will be described with reference to the accompanying drawings. In this process, the thickness of the lines or the size of the components shown on the drawings may be exaggerated for clarity and convenience of description.

In addition, the terms described below are terms defined in consideration of functions in the present invention, and the terms may vary according to a user's or operator's intention or practice. Therefore, definitions of these terms should be made on the basis of the contents throughout this specification.

In addition, the embodiment described below is not intended to limit the scope of the present invention, but to merely illustrate the components presented in the claims of the present invention, and the embodiment included in the spirit throughout the specification of the present invention and including the components that can be substituted with equivalents in the components of the claims may be included in the scope of the present invention.

Figure 1:
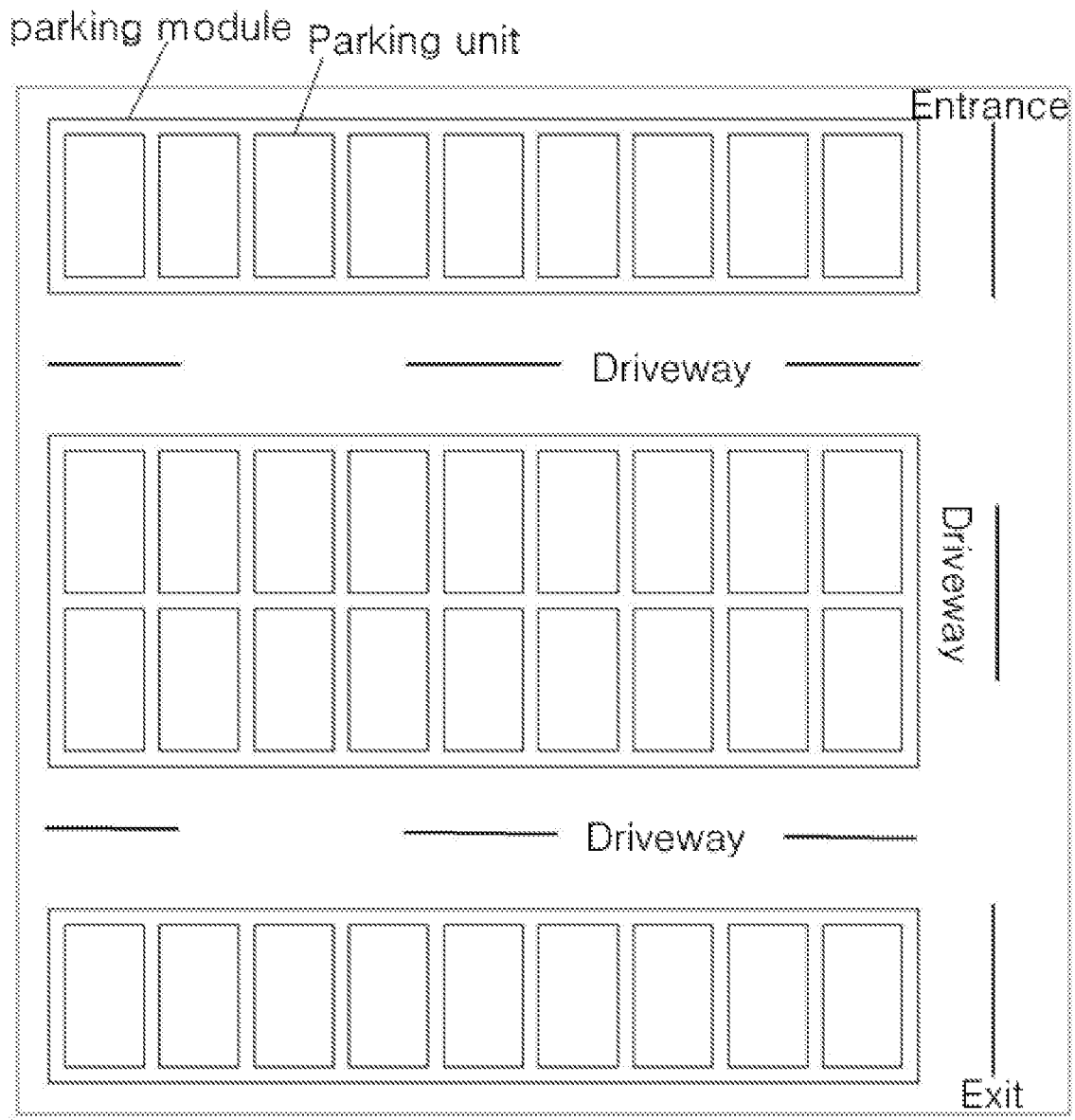
FIG. 1 is a view showing a conventional flat parking lot.
Figure 2:
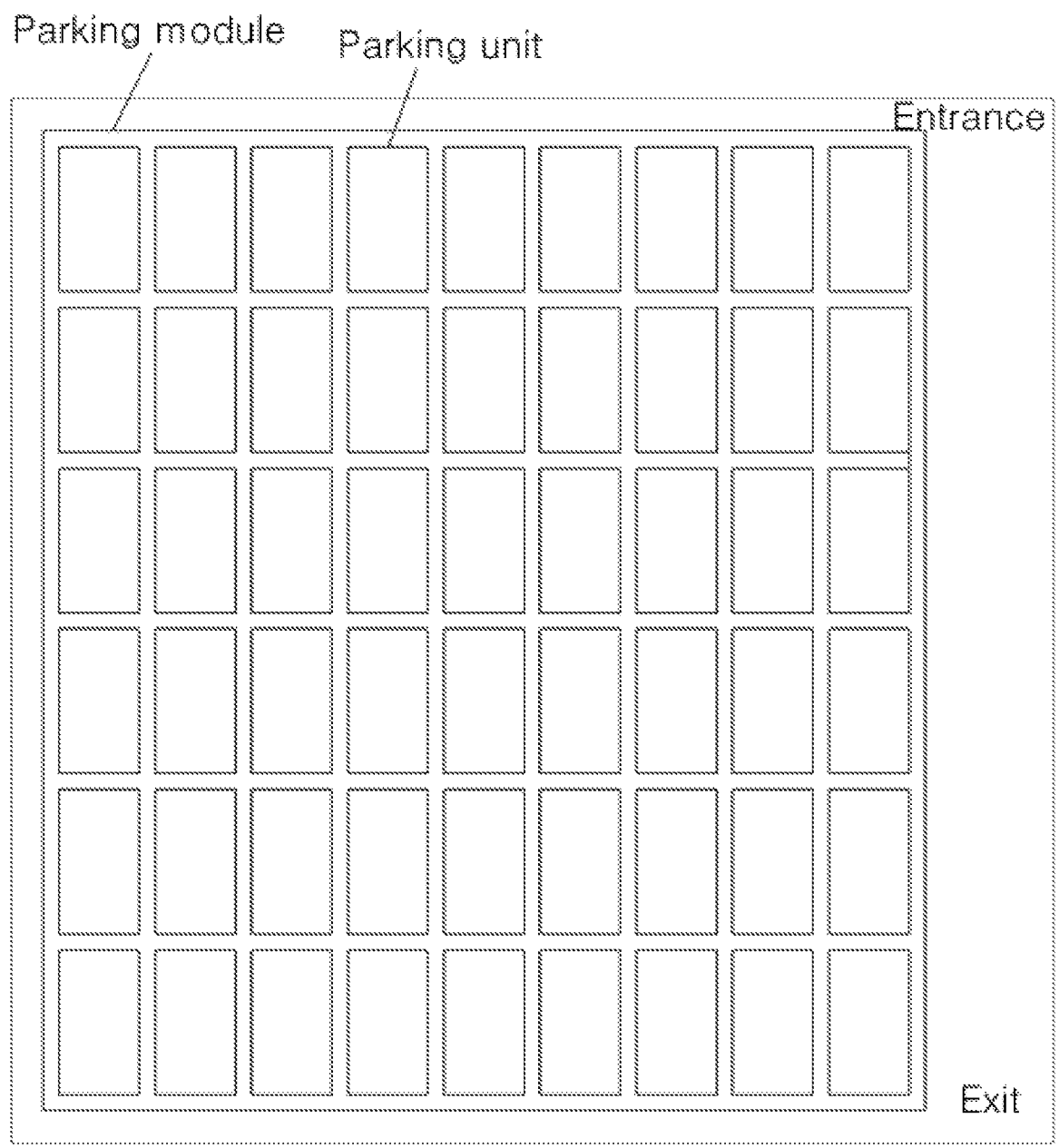
FIG. 2 is a view showing a flat parking lot according to a preferred embodiment of the present invention.
Figure 3:
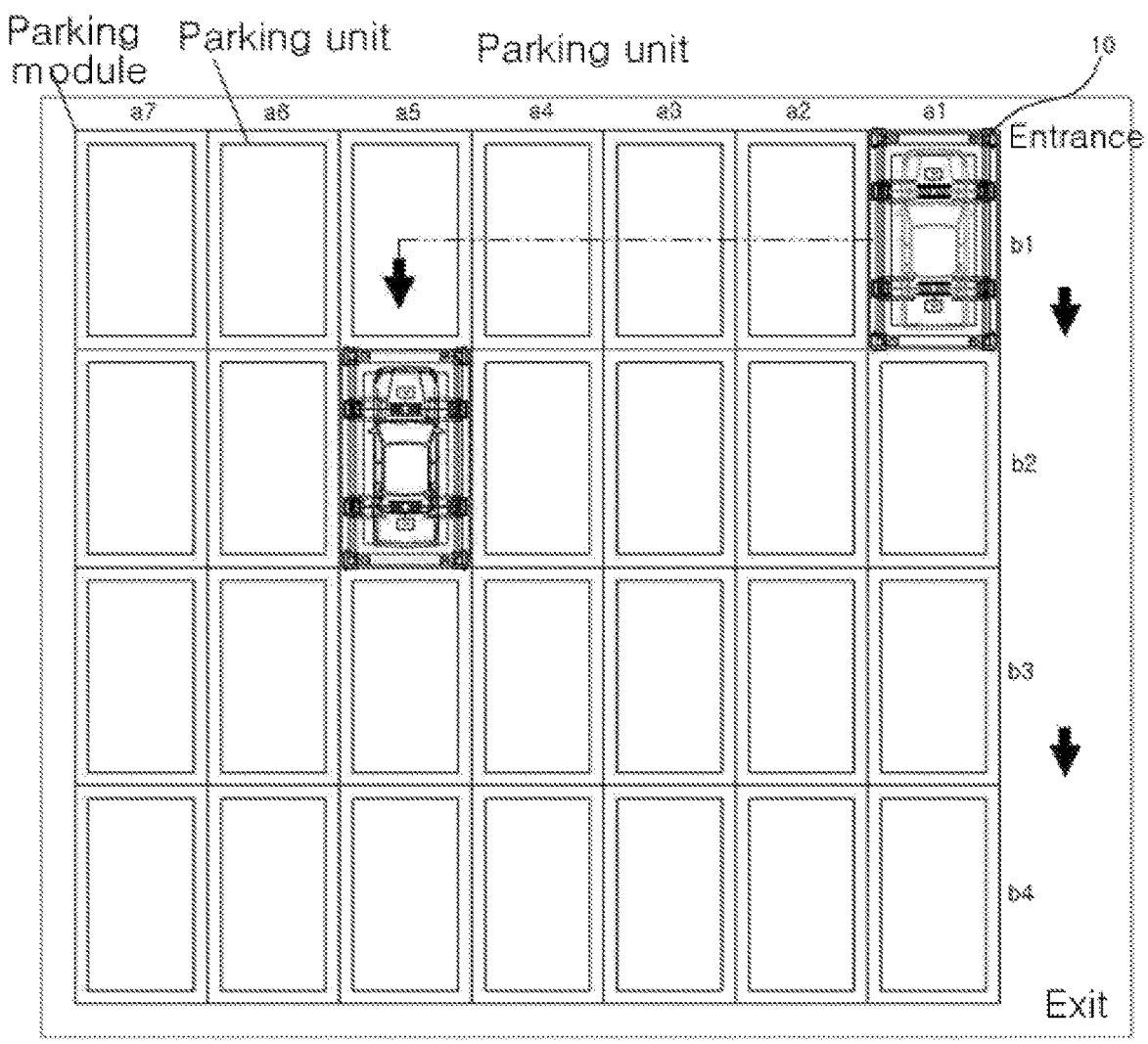
FIG. 3 is a view showing an example of parking a vehicle in a flat parking lot using a vehicle transport robot according to a preferred embodiment of the present invention.
Figure 4:
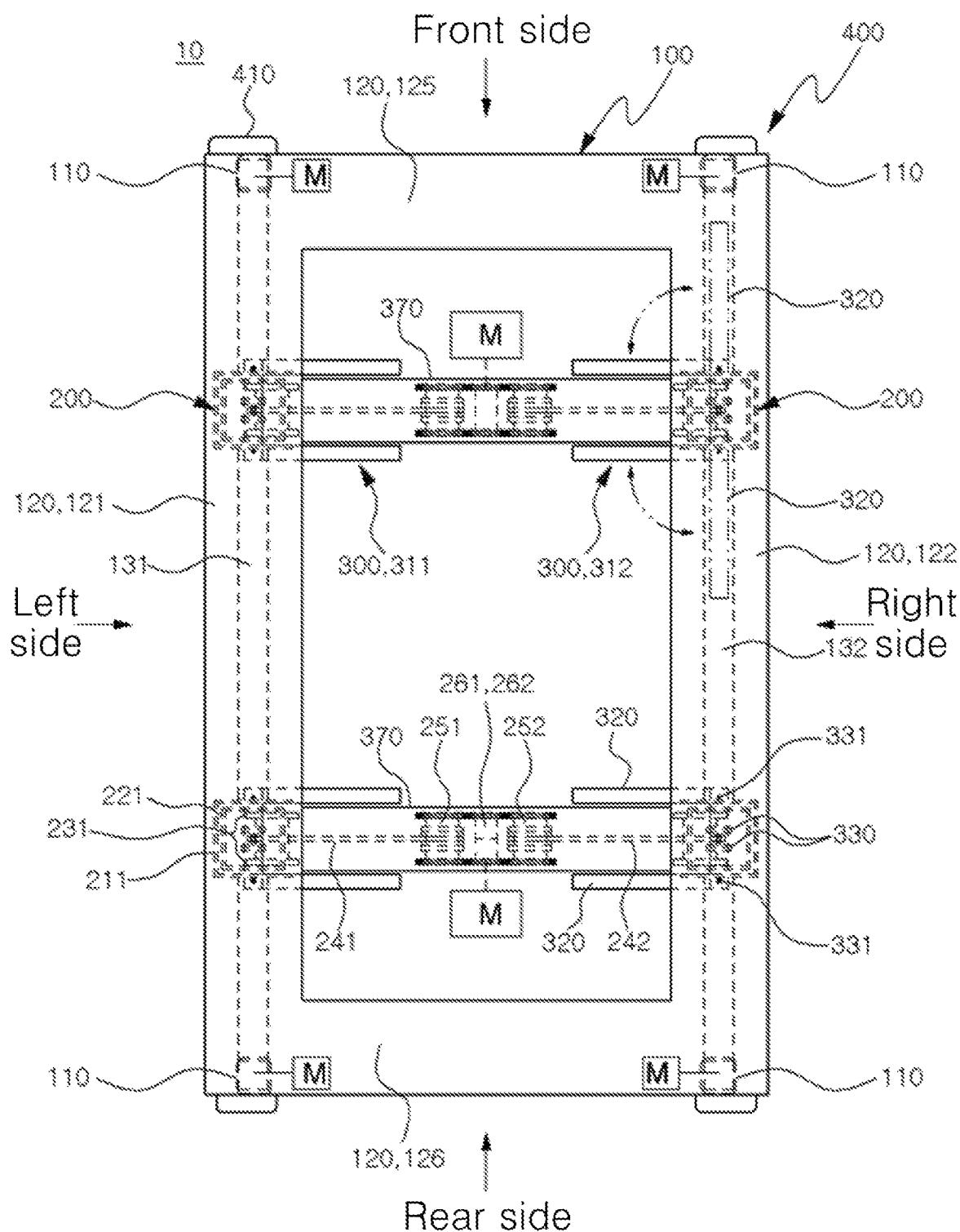
FIG. 4 is a plan view showing a vehicle transport robot according to a preferred embodiment of the present invention.
Figure 5:
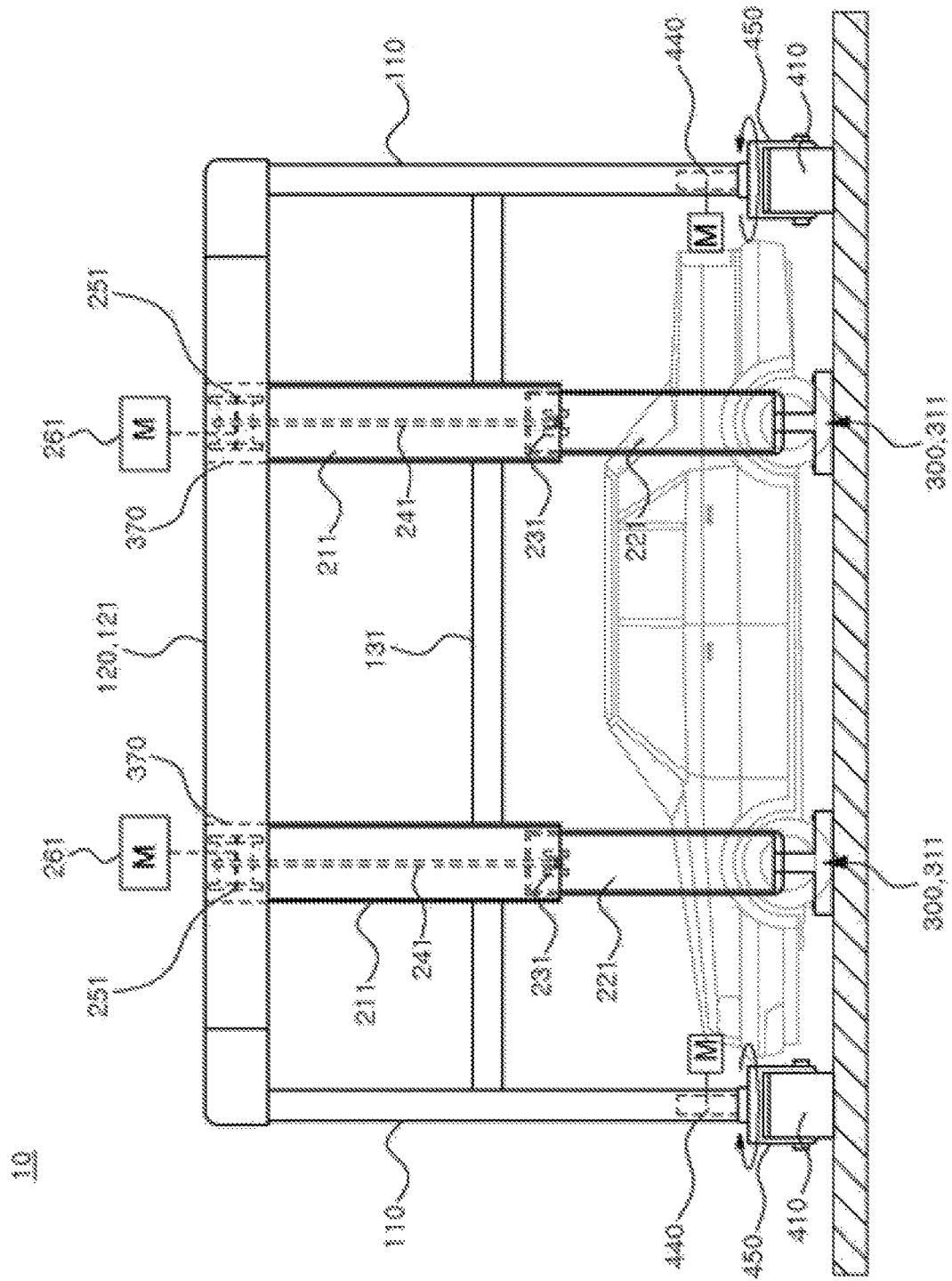
FIG. 5 is a side view showing a vehicle transport robot according to a preferred embodiment of the present invention.
Figure 6:
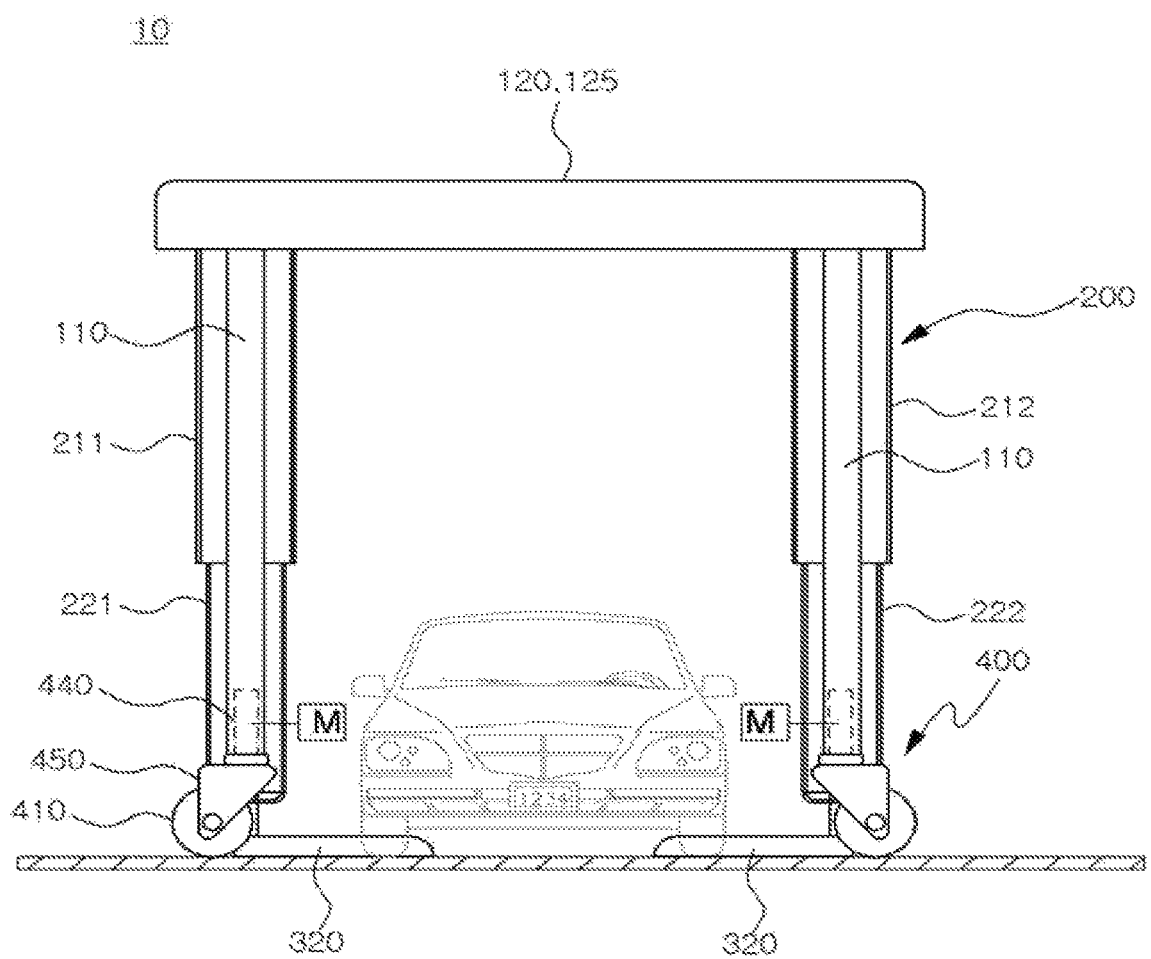
FIG. 6 is a front view showing a vehicle transport robot according to a preferred embodiment of the present invention.
Figure 7:
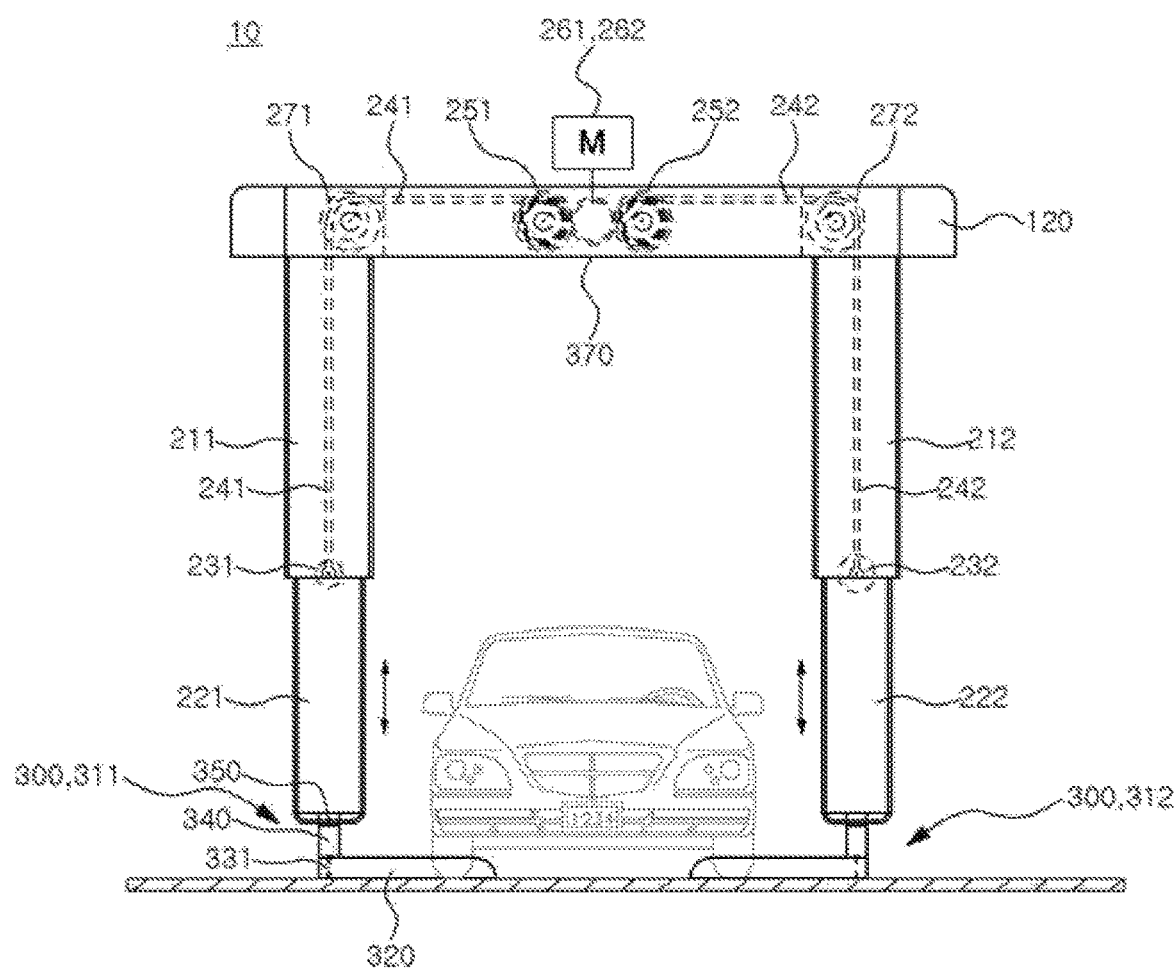
FIG. 7 is a front view showing only a lifting unit according to a preferred embodiment of the present invention.
Figure 8:
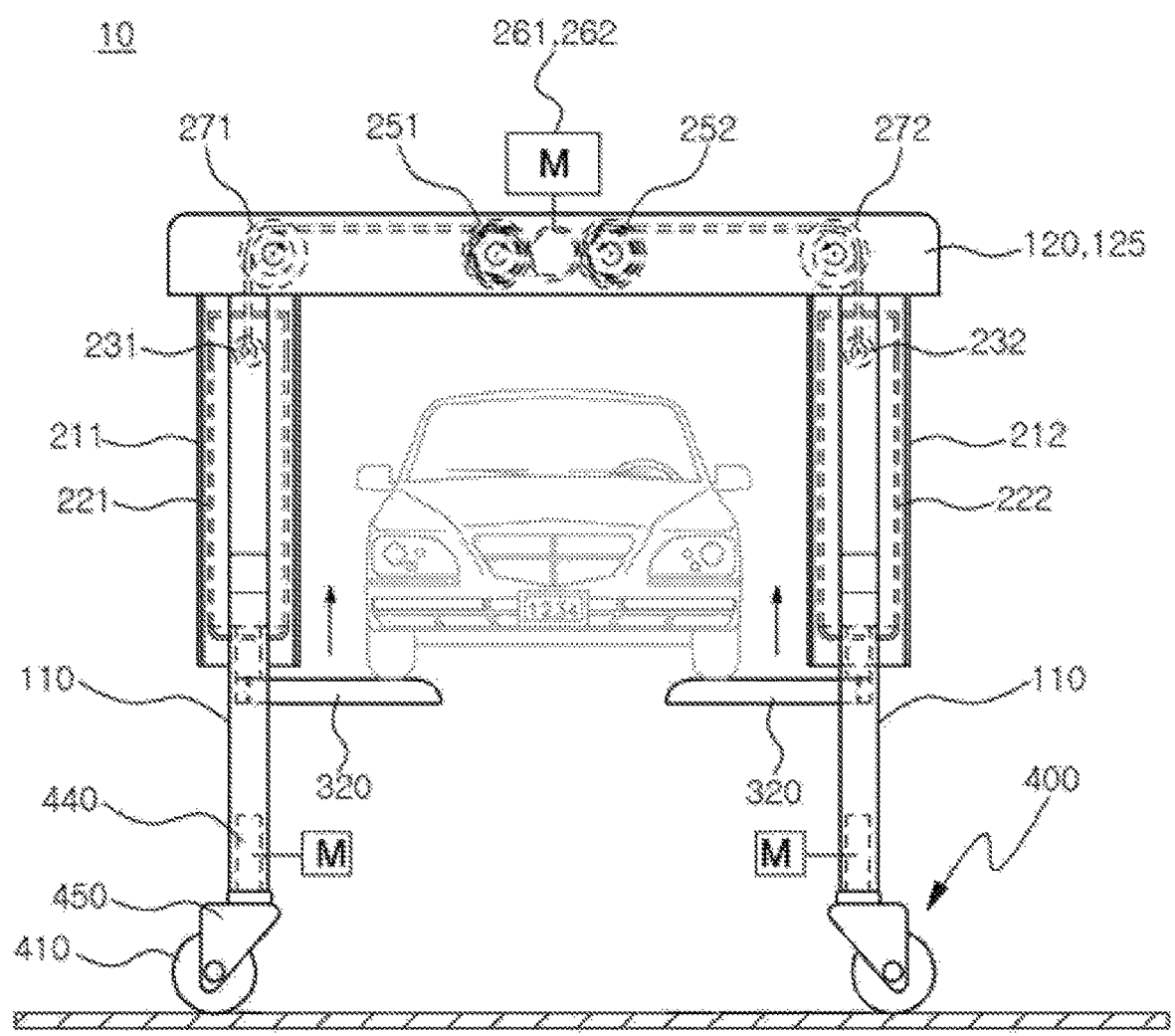
FIG. 8 is a view showing an operation state of lifting a vehicle by a vehicle transport robot according to a preferred embodiment of the present invention.
Figure 9:
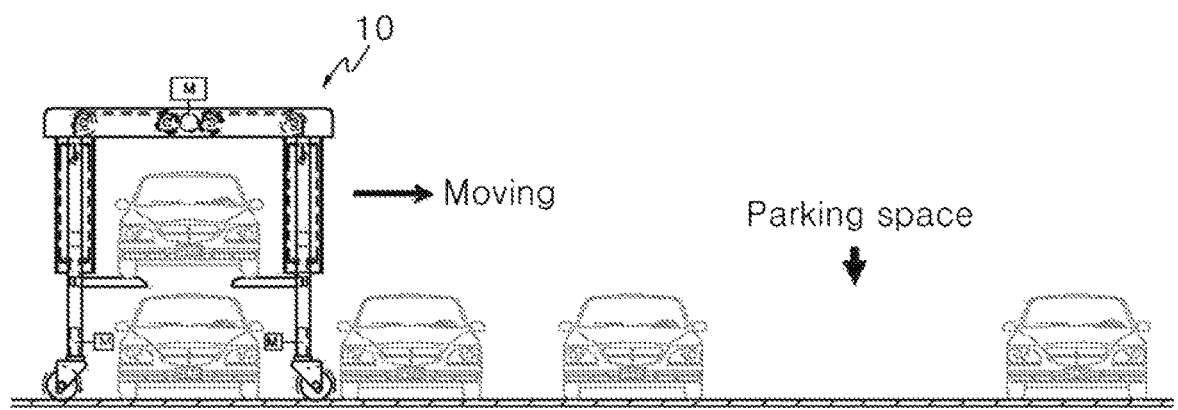
FIG. 9 is a view showing a state of a vehicle loaded and moved on a vehicle transport robot according to a preferred embodiment of the present invention.

The attached FIG. 2 is a view showing a flat parking lot according to a preferred embodiment of the present invention, FIG. 3 is a view showing an example of parking a vehicle in a flat parking lot using a vehicle transport robot according to a preferred embodiment of the present invention, FIG. 4 is a plan view showing a vehicle transport robot according to a preferred embodiment of the present invention, FIG. 5 is a side view showing a vehicle transport robot according to a preferred embodiment of the present invention, FIG. 6 is a front view showing a vehicle transport robot according to a preferred embodiment of the present invention, FIG. 7 is a front view showing only a lifting unit according to a preferred embodiment of the present invention, FIG. 8 is a view showing an operation state of lifting a vehicle by a vehicle transport robot according to a preferred embodiment of the present invention, and FIG. 9 is a view showing a state of a vehicle loaded and moved on a vehicle transport robot according to a preferred embodiment of the present invention.

As shown in FIG. 2 and below, in the present invention, parking lines are marked in a parking lot formed on one plane to indicate vehicle positions where individual vehicles are parked, and as the parking lines are marked in a checkerboard shape, a flat parking lot increases the number of parking vehicles by removing driveways, through which the vehicles move, and a vehicle transport robot 10 performs parking and exit operation of the vehicles in the flat parking lot by moving the vehicles parked in the flat parking lot.

In addition, the vehicle transport robot 10 is formed to move a vehicle to a space above a parked vehicle when parking or exit of the vehicle is progressed in a flat parking lot that enhances parking efficiency by increasing the number of parking vehicles in the same area by removing driveways, through which the vehicles move, and performs parking and exit of vehicles.

In addition, as a position marker (not shown) capable of recognizing a moving position when the vehicle transport robot 10 moves is provided on the marked parking line, and a sensing sensor (not shown) capable of sensing the position marker is attached to the vehicle transport robot 10, the vehicle transport robot 10 may move while tracking the position marker through the sensing sensor.

At this point, it is preferable that the position marker is a reflective material reflecting light or a metal material reacting to electricity, and the sensing sensor is an optical sensor for sensing the position marker through a light emitting unit and a light receiving unit or a magnetic field sensor for generating a magnetic field and sensing the metal material.

In addition, in the vehicle transport robot 10, an identification code is assigned to each parking unit divided by the parking lines.

In addition, the vehicle transport robot 10 includes: a vehicle presence sensor (not shown) for determining whether or not a vehicle exists in a parking unit; an input unit (not shown) for receiving information on entry and exit of a vehicle; a control unit (not shown) for analyzing the information inputted through the input unit, and handling entry and exit of the vehicle; and a storage unit (not shown) for storing the plate number of the vehicle parked in each parking unit.

That is, as shown in FIG. 3, for example, since rows of parking units are defined as b1, b2, b3, . . . , bn from the first to n-th rows, and columns of parking units are defined as a1, a2, a3, . . . , an from the first to n-th columns, an identification code of (a1, b1) is assigned to the top right parking unit.

Accordingly, whether or not a vehicle is parked is separately stored in the storage unit according to the identification code corresponding to each parking unit, and when a user parks a vehicle, the vehicle transport robot 10 may be moved to a parking unit where a vehicle is not parked through the information stored in the storage unit.

In addition, the vehicle presence sensor may be provided as a separate ultrasonic sensor, and may prevent an accident generated by duplicated parking of vehicles at a parking unit where a vehicle is already parked by stopping unloading of the vehicle loaded on the vehicle transport robot 10 according to a signal of the vehicle presence sensor.

In addition, as shown in FIG. 4 and below, the vehicle transport robot 10 is provided with: a frame unit 100 for maintaining an external form; a driving unit 400 for moving the vehicle transport robot 10; a lifting unit 200 for loading and moving a vehicle to an upper position; and a clamping unit 300 for loading the vehicle, and the loaded vehicle is lifted to the upper position through the lifting unit 200 after the vehicle is loaded by the clamping unit 300, and the vehicle transport robot may be moved by the driving unit 400 as the information inputted into the input unit is analyzed through the control unit.

At this point, the frame unit 100 is formed of: four leg units 110 disposed to be perpendicular to the ground, and formed to configure a quadrangular frame while being spaced apart from each other by a predetermined distance; and a top supporter 120 formed to configure a rectangle by connecting top ends of the four leg units 110.

In addition, four sides of the left side, the right side, the front side, and the rear side are formed by the four leg units 110, and the top supporter 120 is divided into two long side top supporters 121 and 122 included in the left side and the right side, and two short side top supporters 125 and 126 included in the front side and the rear side.

In addition, long side middle supporters 131 and 132 are provided in the middle of the left side and the right side under the two long side top supporters 121 and 122 constituting the left side and the right side to connect the middle portions of the leg units 110.

Meanwhile, as shown in FIG. 4 and below, the lifting unit 200 is provided with two left side guide units 211 parallel to the leg units 110 and fixed by connecting the long side top supporter 121 and the long side middle supporter 131 of the left side.

In the present invention, the frame unit 100 may be may be manufactured to be divided into two or four pieces to be easily stored or to save space.

In addition, the lifting unit 200 is provided with two right side guide units 212 parallel to the leg units 110 and fixed to the long side top supporter 122 and the long side middle supporter 132 of the right side.

In addition, the lifting unit 200 is configured of two left side lifting units 221 guided by the two left side guide units 211; a left side lifting hook unit 231 disposed at a predetermined position of the left side lifting unit 221; a left side wire 241 connected to the left side lifting hook unit 231; a left side pulley 251 for winding the left side wire 241; and a left side motor 261 for transferring rotation force to the left side pulley 251.

In addition, the lifting unit 200 is configured of two right side lifting units 222 guided by the two right side guide units 212; a right side lifting hook unit 232 disposed at a predetermined position of the right side lifting unit 222; a right side wire 242 connected to the right side lifting hook unit 232; a right side pulley 252 for winding the right side wire 242; and a right side motor 262 for transferring rotation force to the right side pulley 252.

In addition, left and right side rollers 271 and 272 are provided to change the moving direction of the wire 241 by 90 degrees.

The left and right side rollers 271 and 272 are positioned to be parallel to the left and right side pulleys 251 and 252, and provided on the top of the left and right side lifting hook units.

Accordingly, in the lifting unit 200, the left side lifting unit 221 and the right side lifting unit 222 ascend upward or descend downward as the left side pulley 251 and the right side pulley 252 rotate.

In addition, various methods such as a hydraulic method, a gear method and a lever method may be easily selected and used by those skilled in the art as a method of ascending and descending the left and right side lifting units 221 and 222, and since these methods are techniques widely known in the industrial field, detailed description thereof is omitted.

Meanwhile, as shown in FIG. 4 and below, the clamping unit 300 is provided with a left side clamp unit 311 capable of holding a wheel of a vehicle under the left side lifting unit 221, and a right side clamp unit 312 capable of holding a wheel of the vehicle under the right side lifting unit 222.

Accordingly, when the left and right side lifting units 221 and 222 ascend or descend, the left and right side clamp units 311 and 312 hold the wheels of the vehicle and perform ascending and descending.

In addition, as the clamp units 311 and 312 may support and hold the bottom of the vehicle body frame, ascending and descending of the vehicle may be performed.

In addition, each of the left and right side clamp units 311 and 312 includes: two jaws 320; an actuator 330 for relatively unfolding or folding the two jaws 320; a hinge unit 331 for hinge-connecting each of the jaws 320; a mounting plate 340 for mounting the jaws 320 and the actuator 330; and a connection bracket 350 for fixing the mounting plate 340 to the bottom ends of the left and right side lifting units 221 and 222.

In addition, the lifting unit 200 and the clamping unit 300 may be formed only on one of the left and right sides of the vehicle transport robot 10.

Meanwhile, as a motor fixing unit 370 formed by connecting the long side top supporter 121 of the left side and the long side top supporter 122 of the right side is provided, the left side pulley 251 and the left side motor 261, and the right side pulley 252 and the right side motor 262 are fixed to the motor fixing unit 370.

In addition, the driving unit 400 is disposed at the bottom of each of the four leg units 110, and the driving unit 400 includes a wheel 410, a direction change module 440 for rotating the wheel 410 and changing directions; and a fixing bracket 450 for fixing the driving unit 400 to the leg unit 110.

In addition, the driving unit 400 further includes a wheel rotation motor for transferring rotation force to the wheel, and a direction change motor for changing the direction of the wheel.

In addition, the direction change module changes the direction of the wheel according to the rotation angle of the direction change motor.

In addition, the driving unit 400 is provided with a brake means (not shown) for adjusting the speed of the vehicle transport robot 10 or stopping the vehicle transport robot 10 while the vehicle transport robot 10 moves.

In addition, although an embodiment of the vehicle transport robot is shown on the drawings in the present invention, as this embodiment is an example, the vehicle transport robot is not limited by the embodiment described above.

That is, the vehicle transport robot may be any type as long as it comprises a frame unit configuring a shape, a lifting unit for lifting a vehicle, a driving unit for moving the vehicle transport robot, an actuator for lifting the lifting unit, and a clamp unit for holding the vehicle.

In addition, the frame unit may be divided into various shapes as needed to separately or easily store the frame unit.

Although the present invention has been described in detail through a specific embodiment, this is for describing the present invention specifically, and the present invention is not limited thereto, and it is apparent that modifications and improvements can be made by those skilled in the art within the spirit of the present invention.

All simple modifications or changes of the present invention belong to the scope of the present invention, and the specific protection scope of the present invention will be clarified by the appended claims.

DESCRIPTION OF SYMBOLS

10: Vehicle transport robot
100: Frame unit
110: Leg unit
120: Top supporter
121, 122: Left and right side long side top supporters
125, 126: Front and rear side short side top supporters
131, 132: Left and right side long side middle supporters
200: Lifting unit
211, 212: Left and right side guide units
221, 222: Left and right side lifting units
231, 232: Left and right side lifting hook units
241, 242: Left and right side wires
251, 252: Left and right side pulleys
261, 262: Left and right side motors
300: Clamping unit
311, 312: Left and right side clamp units
320: Jaw
331: Hinge unit
340: Mounting plate
350: Connection bracket
370: Motor fixing unit
400: Driving unit
410: Wheel
440: Direction change module 450: Fixing bracket

The invention claimed is:

1. An intelligent vehicle transport robot of a flat parking lot, wherein
   parking lines indicating vehicle positions where individual vehicles are parked are marked in the flat parking lot formed on one plane, and
   as the parking lines are marked in a checkerboard shape and remove driveways, through which the vehicles move, the number of parking vehicles is increased, and
   as the vehicle transport robot (10) is provided in the parking lot to perform parking and exit operation of the vehicles by moving a vehicle to a space above a parked vehicle, parking efficiency is enhanced as the number of parking vehicles is increased in the same area by removing driveways, through which the vehicles move,
   wherein the vehicle transport robot (10) includes:
   a frame unit (100) for maintaining an external form;
   a driving unit (400) for moving the vehicle transport robot (10);
   a lifting unit (200) for moving a vehicle to an upper position; and
   a clamping unit (300) for loading the vehicle,
   wherein the loaded vehicle is lifted to the upper position through the lifting unit (200) after the vehicle is loaded by the clamping unit (300),
   wherein the lifting unit (200) includes:
   two left side guide units (211) parallel to the leg units (110) and fixed by connecting a long side top supporter (121) a long side middle supporter (131) of the left side;
   two right side guide units (212) parallel to the leg units (110) and fixed to a long side top supporter (122) and a long side middle supporter (132) of the right side;
   two left side lifting units (221) guided by the two left side guide units (211); and
   two right side lifting units (222) guided by the two right side guide units (212),
   wherein the left side lifting unit (221) and the right side lifting unit (222) ascend upward or descend downward.

2. The robot according to claim 1, wherein the frame unit (100) includes:
   four leg units (110) disposed to be perpendicular to the ground, and formed to configure a quadrangular frame while being spaced apart from each other by a predetermined distance; and
   a top supporter (120) formed to configure a rectangle by connecting top ends of the four leg units (110), wherein
   four sides of a left side, a right side, a front side, and a rear side are formed by the four leg units (110), and the top supporter (120) is divided into two long side top supporters (121) and (122) included in the left side and the right side, and two short side top supporters (125) and (126) included in the front side and the rear side, and
   the long side middle supporters (131) and (132) are provided in the middle of the left side and the right side under the two long side top supporters (121) and (122) constituting the left side and the right side to connect middle portions of the leg units (110).

3. The robot according to claim 1, wherein the lifting unit (200) further includes:
   a left side wire (241) connected to the left side lifting hook unit (231);
   a left side pulley (251) for winding the left side wire (241);
   a left side motor (261) for transferring rotation force to the left side pulley (251);

a right side lifting hook unit (232) disposed at a predetermined position of the right side lifting unit (222);

a right side wire (242) connected to the right side lifting hook unit (232);

a right side pulley (252) for winding the right side wire (242); and a right side motor (262) for transferring rotation force to the right side pulley (252), wherein the left side lifting unit (221) and the right side lifting unit (222) ascend upward or descend downward as the left side pulley (251) and the right side pulley (252) rotate.

4. The robot according to claim 3, wherein a left side clamp unit (311) capable of holding a wheel of the vehicle is provided under the left side lifting unit (221), and a right side clamp unit (312) capable of holding a wheel of the vehicle is provided under the right side lifting unit (222), and when the left and right side lifting units (221) and (222) ascend or descend, the left and right side clamp units (311) and (312) hold the wheels of the vehicle and perform ascending and descending.

\* \* \* \* \*